(12) United States Patent
Heideman et al.

(10) Patent No.: US 7,366,765 B1
(45) Date of Patent: *Apr. 29, 2008

(54) OUTBOARD CLUSTERED COMPUTER SYSTEMS MANAGER UTILIZING COMMODITY COMPONENTS

(75) Inventors: Michael J. Heideman, New Brighton, MN (US); Dennis R. Konrad, Welch, MN (US); David A. Novak, Coon Rapids, MN (US)

(73) Assignee: Unisys Corporation, Blue Bell, PA (US)

( * ) Notice: Subject to any disclaimer, the term of this patent is extended or adjusted under 35 U.S.C. 154(b) by 790 days.

This patent is subject to a terminal disclaimer.

(21) Appl. No.: 10/346,392

(22) Filed: Jan. 17, 2003

(51) Int. Cl.
*G06F 15/16* (2006.01)

(52) U.S. Cl. ............................. 709/209; 707/4; 707/10; 714/11

(58) Field of Classification Search ................ 709/201; 707/8; 710/200; 711/114; 714/11
See application file for complete search history.

(56) References Cited

U.S. PATENT DOCUMENTS 5,940,826 A * 8/1999 Heideman et al. ............. 707/8
6,625,750 B1 * 9/2003 Duso et al. .................... 714/11
6,883,065 B1 * 4/2005 Pittelkow et al. ........... 711/114

* cited by examiner

*Primary Examiner*—Yves Dalencourt
(74) *Attorney, Agent, or Firm*—Charles A. Johnson; Robert Marley; Nawrocki, Rooney & Sivertson PA

(57) ABSTRACT

An apparatus for and method of implementing a cluster lock processing system using highly scalable, off-the-shelf commodity processors. The cluster lock processing system is the central component of a clustered computer system, providing locking and coordination between multiple host systems. The host systems are coupled to the cluster lock processing system using off-the-shelf, low latency interconnects. The cluster lock processing system is composed of multiple commodity platforms that are also coupled to each other using low latency interconnects. Failure of one of the commodity platforms that comprise the cluster lock processing system results in no loss of functionality or interruption of service. This is made possible through the use of specialized software that runs on the commodity platforms. Through the use of custom software and inexpensive hardware the overall system cost is dramatically reduced when compared to typical solutions that use custom built hardware. By allowing the individual commodity platforms to be physically separated, the cluster lock processing system also provides for resiliency against physical damage to an individual platform that may be caused by a catastrophic site failure.

8 Claims, 18 Drawing Sheets

AUDIT BUFFER CONTROL ENTRY (ABCE)

| Row | 31 — 15 | 15 — 0 |
|---|---|---|
| 0 | STATE ||
| 1 | TRANSACTION_NUMBER ||
| 2 | TRANSACTION_INITIATION_TIME ||
| 3 | RESERVED | LAST_PKT_RECEIVED |
| 4 | SRR_ADDRESS-SRR_PKT_NUM_1 ||
| 5 | SRR_ADDRESS-SRR_PKT_NUM_2 ||
| 6 | SRR_ADDRESS-SRR_PKT_NUM_3 ||
| 7 | SRR_ADDRESS-SRR_PKT_NUM_4 ||
| 8 | SRR_ADDRESS-SRR_PKT_NUM_5 ||
| 9 | SRR_ADDRESS-SRR_PKT_NUM_6 ||
| 10 | SRR_ADDRESS-SRR_PKT_NUM_7 ||
| 11 | SRR_ADDRESS-SRR_PKT_NUM_8 ||
| 12 | SRR_ADDRESS-SRR_PKT_NUM_9 ||
| 13 | RESERVED ||
| 14 | RESERVED ||
| 15 | RESERVED ||

FIG. 16

OUTBOARD CLUSTERED COMPUTER SYSTEMS MANAGER UTILIZING COMMODITY COMPONENTS

CROSS REFERENCE TO CO-PENDING APPLICATIONS

U.S. patent application Ser. No. 10/346,458, filed Jan. 17, 2003, and entitled, "Standard Channel I/O Processor (SCIOP)"; U.S. patent application Ser. No. 10/346,459, filed Jan. 17, 2003, and entitled, "Ability to Support Non-Proprietary Locking Protocols"; U.S. patent application Ser. No. 10/346,301, filed Jan. 17, 2003, and entitled, "Support for Two-Phase Commit in Multi-Host Systems"; U.S. patent application Ser. No. 10/346,696, filed Jan. 17, 2003, and entitled, "Software Control Using the Controller as a Component to Achieve Disaster Resiliency in a Computer System Utilizing Separate Servers for Redundancy"; U.S. patent application Ser. No. 10/346,930, filed Jan. 17, 2003, and entitled, "A Method for Generating a Unique Identifier and Verifying a Software License in a Computer System Utilizing Separate Server for Redundancy"; U.S. patent application Ser. No. 10/346,933, filed Jan. 17, 2003, and entitled, "A Clustered Computer System Utilizing Separate Servers for Redundancy in Which the Host Computers are Unaware of the Usage of Separate Servers"; U.S. patent application Ser. No. 10/346,489, filed Jan. 17, 2003, and entitled, "A Method for Allowing a Clustered Computer Systems Manger to Use Disparate Hardware on Each of the Separate Servers Utilized for Redundancy"; U.S. patent application Ser. No. 10/347,009, filed Jan. 17, 2003, and entitled, "A Method for Shortening the Resynchronization Time Following Failure in a Computer System Utilizing Separate Servers for Redundancy"; U.S. patent application Ser. No. 10/346,456, filed Jan. 17, 2003, and entitled, "A Method for Obtaining Higher Throughput in a Computer System Utilizing a Clustered Systems Manager"; U.S. patent application Ser. No. 10/346,411, filed Jan. 17, 2003, and entitled, "A Method for Distributing the Processing Among Multiple Synchronization Paths in a Computer System Utilizing Separate Servers for Redundancy" are commonly assigned co-pending applications incorporated herein by reference.

BACKGROUND OF THE INVENTION

1. Field of the Invention

The present invention generally relates to data processing systems and more particularly relates to data processing system architectures which employ a relatively large number of clustered instruction processors.

2. Description of the Prior Art

It is known in the prior art to increase the computational capacity of a data processing system through enhancements to an instruction processor. It is also known that enhancements to instruction processors become extremely costly to design and implement. Because such enhancements tend to render the resulting system special purpose in nature, the quantities of such enhanced processors needed within the market place is quite small, thus tending to further increase per unit costs.

An early approach to solving this problem was the "super-computer" architecture of the 60's, 70's, and 80's. Using this technique, a single (or small number of) very large capacity instruction processor(s) is surrounded by a relatively large number of peripheral processors. The large capacity instruction processor is more fully utilized through the work of the peripheral processors which queue tasks and data and prepare needed output. In this way, the large capacity instruction processor does not waste its time doing the more mundane input/output and conversion tasks.

This approach was found to have numerous problems. Reliability tended to rest solely on the reliability of the large capacity instruction processor, because the peripheral processors could not provide efficient processing without it. On the other hand, at least some of the peripheral processors are needed to provide the large capacity instruction processor with its only input/output interfaces. The super computer approach is also very costly, because performance rests on the ability to design and build the uniquely large capacity instruction processor.

An alternative to increasing computational capacity is the employment of a plurality of instruction processors into the same operational system. This approach has the advantage of generally increasing the number of instruction processors in the market place) thereby increasing utilization volumes. It is further advantageous that such an approach tends to utilize redundant components, so that greater reliability can be achieved through appropriate coupling of components.

However, it is extremely difficult to create architectures which employ a relatively large number of instruction processors. Typical problems involve: non-parallel problems which cannot be divided amongst multiple instruction processors; horrendous management problems which can actually slow throughput because of excessive contention for commonly used system resources; and system viability issues arising because of the large number of system components which can contribute to failures that may be propagated throughout the system. Thus, it can be seen that such a system can decrease system performance while simultaneously increasing system cost.

An effective solution is the technique known as the "cluster/lock processing system", such as the XPC (Extended Processing Complex available from Unisys Corporation and described in U.S. Pat. No. 5,940,826, entitled "Dual XPCs for Disaster Recovery in Multi-Host Environments", which is incorporated herein by reference). This technique utilizes the XPC with a relatively large number of instruction processors which are "clustered" about various shared resources. Tasking and management tends to be decentralized with the clustered processors having shared responsibilities. Maximal redundancy is utilized to enhance reliability.

Though a substantial advance, the cluster/lock systems tend to solve the reliability problems but remain relatively costly to implement, because virtually all of the hardware and firmware are specifically designed and manufactured for the cluster/lock architecture. This is necessary to enable each of the system components to effectively contribute to system reliability, system management, and system viability As a result, demand volumes remain relatively low.

SUMMARY OF THE INVENTION

The present invention overcomes the disadvantages of the prior art by providing a technique which incorporates a relatively large number of low cost instruction processors into an extremely high performance, high reliability, relatively low cost cluster/lock system. The low cost is largely achieved by utilizing "commodity" hardware and operating system software for the large numbers of instruction processors. In this sense, a "commodity" system component is one which is designed for and marketed to the general public. For example, in the preferred mode of the present invention, each of the large number of instruction processors is essentially an industry compatible personal computer chip available from Intel Corporation, similar to that found in many "high-end" home computers. Similarly, these instruction processors employ a commonly available operating system, such as a current version of "Windows" available from Microsoft Corporation.

As is well known, these commodity components, though relatively inexpensive because of the high production volumes, do not have the reliability features found in the more specialized hardware and software typically utilized for commercial, industrial, and defense applications. In fact, most home computer users are well aware of and simply learn to live with the reliability problems well known to exist in these commodity systems. Unlike previous cluster processing systems, the approach of the present invention does not incur the expense of upgrading these commodity components, but utilizes them as they exist in the market place.

Because the commodity components employed do not meet the desired levels of reliability, etc., virtually all system management, system reliability, and system viability responsibility is assigned to a centralized entity called the "cluster lock server". This server is not specifically developed for the present system, but already exists in the market place and is currently available to commercial and industrial users. In the preferred mode of practicing the present invention, the cluster lock server is an ES-7000 System available from Unisys Corporation. The cluster lock servers are preferably employed in tandem for recovery from single point failures.

The cluster lock server hardware employs a set of software representatively called a "cluster lock manager" (CLM). This software is a component that communicates with each of the hosts and can assume the role of either master or slave. In the role of master, it receives and processes a host request for a database lock, read or write to cache, or inter-host message. It then informs any slave CLM of all memory updates resulting from the request and returns status to the requesting host. When in the role of slave, the CLM routes any request it receives directly from a host to the master CLM, accepts and performs all memory updates from the master CLM for each host request, and returns status to a host if the request was received directly by the slave CLM from a host.

As a result of the innovative architecture of the preferred mode of the present invention, extremely large processing capacity computer systems are clustered together using only off-the-shelf hardware and software with the addition of cluster lock manager software. Therefore, hardware and software costs are extremely low in view of the cluster lock processing systems processing capacity.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 16 shows the format of an Audit Buffer Control Entry (ABCE) utilized in master/slave communication;

DETAILED DESCRIPTION OF THE PREFERRED EMBODIMENTS

The present invention is described in accordance with several preferred embodiments which are to be viewed as illustrative without being limiting. These several preferred embodiments are based upon mainframe hardware components and various operating system software components available from Unisys Corporation and commodity hardware and software components available from Microsoft Corporation, Intel Corporation, and in the general personal computer market place.

Figure 1:
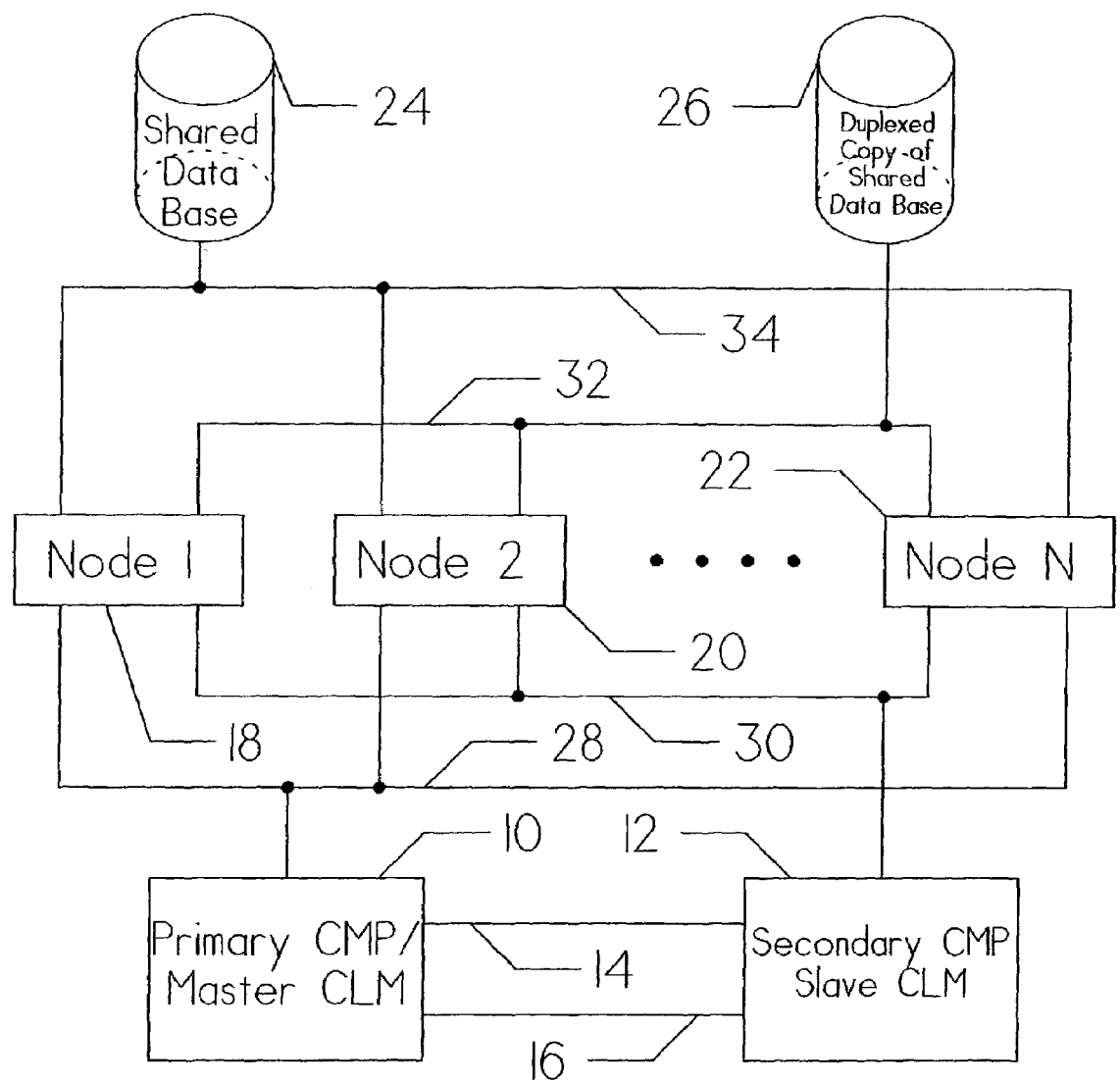
FIG. 1 is detailed block diagram showing a generalized clustered computer system in accordance with the present invention.

FIG. 1 is a detailed diagram showing the general relationship of the major components that comprise a clustered computer system. The host systems are represented by Node 118, Node 220, and Node N 22. The total number of host systems are selected for the particular system application(s). Each of these instruction processors communicate with Data Base 24 and Duplex Copy 24 of Data Base 24 via busses 34 and 32, respectively. This provides the redundancy necessary to recover from single point of failures within the data base.

In addition to the interface with the data base and its duplicate copy, the host systems can communicate only with Primary CLS (Cluster Lock Server) 10 and Secondary CLS 12 via busses 28 and 30, respectively. Redundant connections to redundant cluster lock servers ensures that single point control structure failures can also be accommodated. Because the sole interface between the host systems (i.e., Nodes 1, 2, . . . N) is with the Primary CLS and Secondary CLS, all services to be provided to an individual host system must be provided by the Primary CLS or Secondary CLS. The primary services provided include: 1) services to synchronize updates to one or more shared databases; 2) services to facilitate inter-node communication; 3) services to provide for shared data among the nodes; 3) services to detect failing nodes in the cluster; and 4) duplication of all information contained in the Primary Cluster Lock Server.

Services provided for synchronization of database updates assume all nodes in the cluster use the same locking protocol. The Cluster Lock Manager (CLM) is the "keeper" of all locks for shared data. The locking functionality includes: 1) ability for any node to request and release database locks; 2) ability to support multiple locking protocols; 3) asynchronous notification to the appropriate node when a lock has been granted; 4) automatic deadlock detection including the ability to asynchronously notify the nodes owning the locks that are deadlocked; and 5) support for two-phase commit processing including holding locks in the "ready" state across recoveries of individual nodes.

Inter-node communication services provide the capability for any node to send messages to and receive messages from any other node in the cluster. The ability for a node to broadcast to all other nodes is also provided.

Shared data services provide the capability for the nodes to share the common data structures required to facilitate the management and coordination of the shared processing environment. This data is maintained within the CLM.

Failed node detection services include heartbeat capability, the ability to move in-progress transactions from a failed node onto other nodes and the ability to isolate the failed node.

Although not required to practice the invention, in the preferred mode, the cluster lock processing system is composed of a Primary/Secondary cluster lock server and a master/slave cluster lock manager. The nodes communicate with the master or slave and the master ensures all data is duplicated in the slave. The ability to manually switch from the master to the slave is also provided in the preferred mode. Manual switching facilitates testing and maintenance. Of course, automatic switching occurs upon failure of the master CLM.

Figure 2:
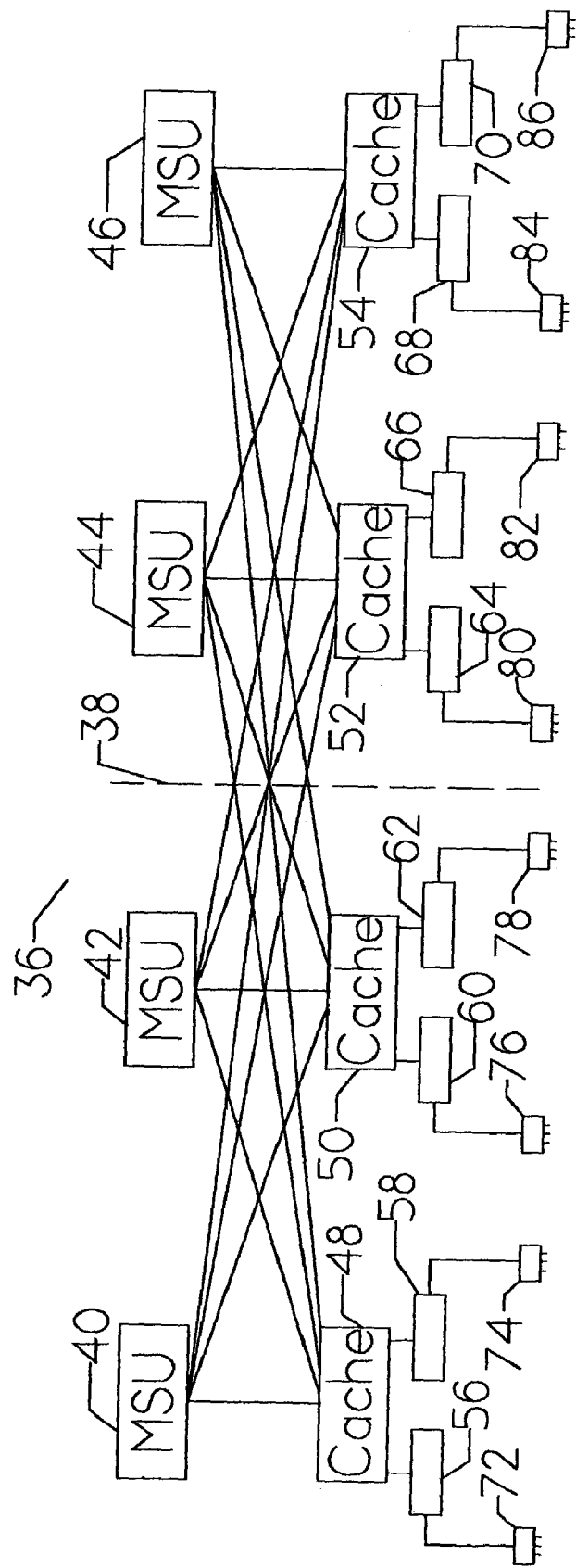
FIG. 2 is a detailed diagram showing the architecture of the cluster lock server.

FIG. 2 is a detailed block diagram 36 of a fully populated ES-7000 Cellular Multi-Processor (CMP) system available from Unisys Corporation. Each of Primary CLS 10 (see FIG. 1) and Secondary CLS 12 (see FIG. 1) consists of one of these computers. The ES-7000 CMP is a commercially available product available from Unisys Corporation now on the market. One key advantage of this computer is that it makes the cluster lock server inherently scalable. It should be readily apparent that the total processing load on a cluster lock server increases directly with the number of clustered instruction processors which are directly managed by that cluster lock server. Thus, it is of substantial value that a readily scalable processor is utilized for this purpose. It is further assumed that the cluster lock server has the inherent reliability (e.g., failure recovery) and system viability (e.g., memory and shared resource protection) functionality to assume responsibility for these aspects of the system's operation.

A fully populated CMP contains up to four main memory storage units, MSU 40, MSU 42, MSU 44, and MSU 46. These are interfaced as shown through up to four cache memory systems, Cache 48, Cache 50, Cache 52, and Cache 54. Each of subpods 56, 58, 60, 62, 64, 66, 68, and 70 contains up to four instruction processors, each having its own dedicated cache memories. Duplexed input/output processors 72, 74, 76, 78, 80, 82, 84, and 86 interface with the commodity instruction processors (see FIG. 1), with other cluster lock server(s), and with host computers (see below). Thus, each of the cluster lock servers (i.e., Primary CLS 10 and Secondary CLS 12, see FIG. 1) preferably consists of an ES-7000 CMP having from one to four MSU's, one to four Cache's, one to eight subpods, and one to eight duplexed input/output processors.

To further enhance reliability, and already a part of the ES-7000 CMP system, various of the components are separately powered. In accordance with the fully populated system of block diagram 36, all components left of line 38 are powered by a first power source (not shown) and all components right of line 38 are powered by a second power source (not shown). In this manner, the system remains viable even during the course of a single power source failure.

Figure 3:
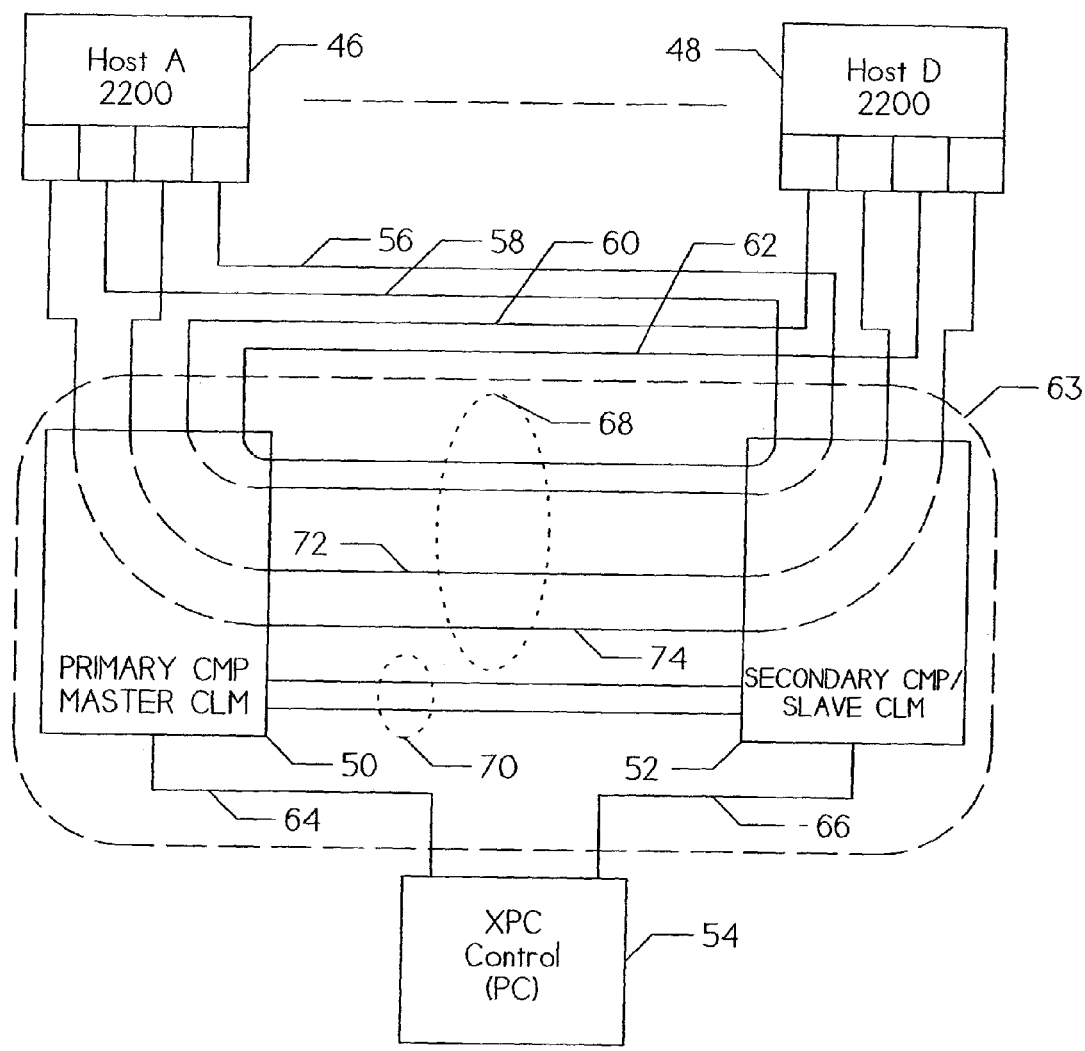
FIG. 3 is a detailed schematic diagram showing data flow paths within the overall system of the present invention.

FIG. 3 is a detailed block diagram showing implementation of the cluster processing system (XPC) 63 of the present invention within a practical configuration for high capacity and high reliability data processing. The major components include Primary CMP/Master CLM 50 and Secondary CMP/Slave CLM 52 and connections 68 and 70 between them. The actual clustered instruction processors (i.e., Nodes 1-N) are not separately shown except through their interface with the XPC. XPC control 54 is a personal computer implemented as control console which interfaces with the XPC via intercomputer paths 64 and 66.

The "external world" is shown as Host A 46 through Host D 48, which are coupled to the XPC via intercomputer paths 56, 58, 60, and 62. The host computers are preferably Model 2200 mainframe computers available from Unisys Corporation. The paths are arranged to provide completely redundant paths amongst all major components. Paths 68 are the Primary/Secondary crossover paths wherein paths 72 and 74 are redundant request/status packet routing paths. Paths 70 are the Primary/Secondary synchronization paths.

A typical exchange between the host computers 46 and 48 and the XPC 63 further helps to illustrate the overall system operation. The Host D 48 issues a request via intercomputer path 60. The Master CLM 50 processes the request and generates an SRR packet 84 (see FIG. 5) containing audit data that is routed to the Slave CLM 52 via one of the Synchronization Paths 70. The Slave CLM 52 receives the SRR packet 84 via one of the Synchronization Paths 70, performs the data updates defined in the SRR packet 84 and sends an SRR packet 84 containing 'audit updates completed' on the same Synchronization Path. The Master CLM 50 receives the SRR packet 84 containing the 'audit updates completed' and completes the request by sending a status packet to Host D 48 via intercomputer path 60.

Figure 4:
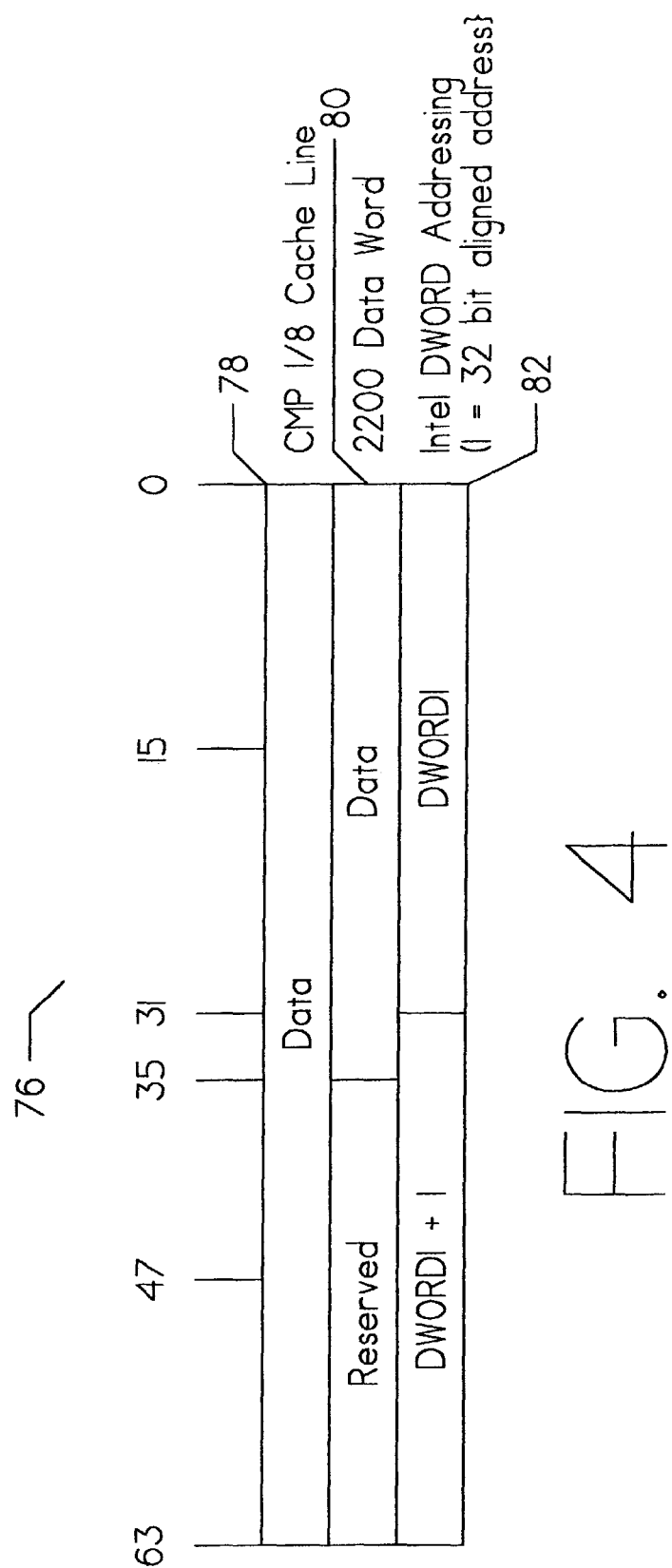
FIG. 4 is a diagram showing the format of data transfers between the commodity processors and the host computers.

FIG. 4 is a detailed diagram 76 showing the format for data conversion between the XPC 63 with Host A through Host D. Host A through Host D, being Model 2200 mainframes from Unisys Corporation, have a basic 36 bit word internal format, whereas the XPC is basically byte oriented with 16 bit, 32 bit, and 64 bit words. A 64 bit data word 78 corresponds to a 36 bit Model 2200 data word 80, and two 32 bit Intel DWORD's 82.

Figure 5:
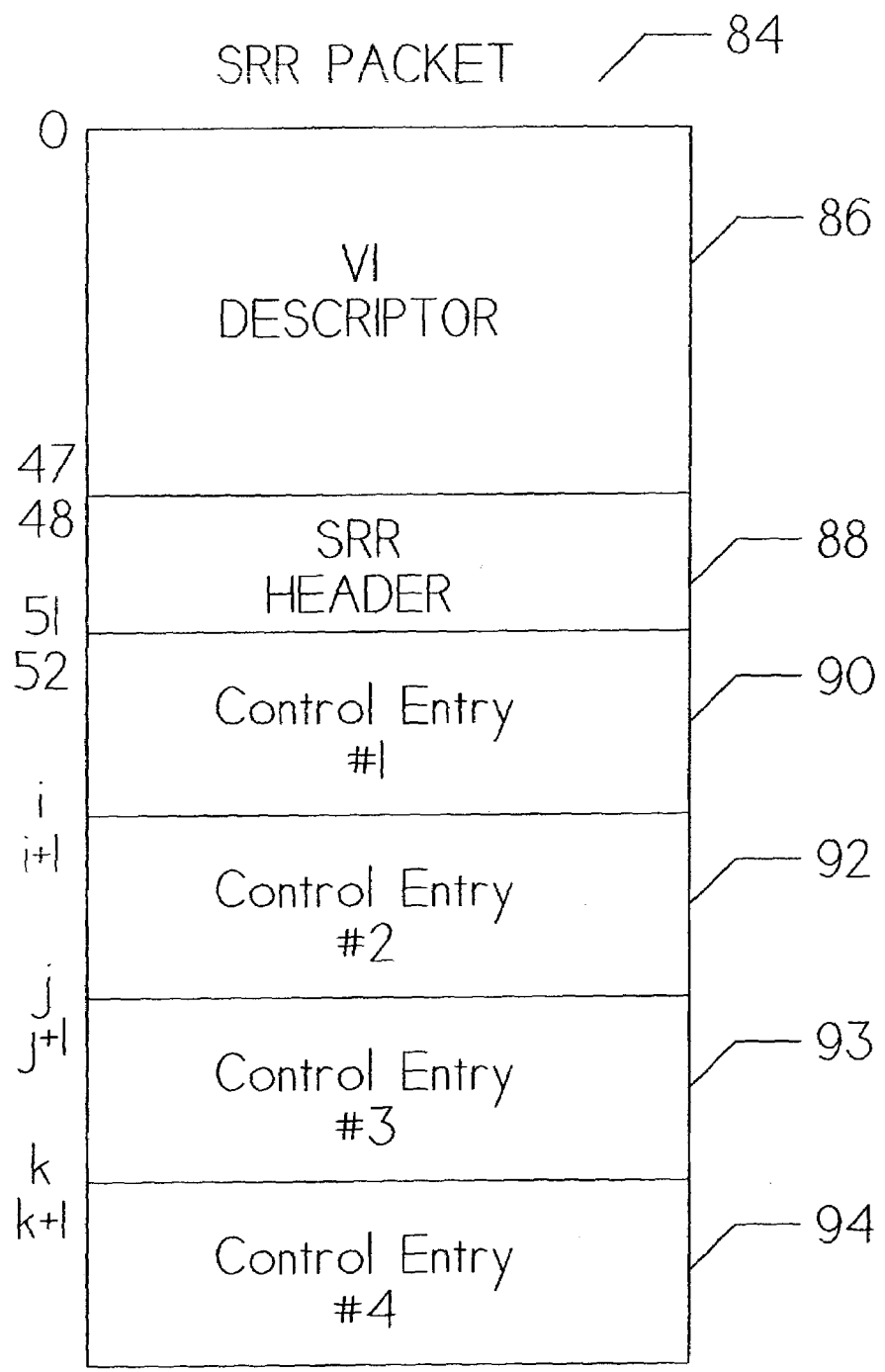
FIG. 5 shows the format of the Synchronization path Request/Response (SRR) packet.

FIG. 5 is a diagram 84 showing the format of a Synchronization path Request/Response (SRR) packet. Though the SRR packets are primarily used to convey audit data from master to slave, they are also used to implement the master/slave control functions. The first 48 words contain Descriptor 86. This is followed by Header 88. A number of control entries (i.e., Control Entry #1 90, Control Entry #2 92, Control Entry #3 93, and Control Entry #4 94) provide the actual control information. Each of the control entries has a variable length depending upon the function to be performed, as explained below.

Figure 6:
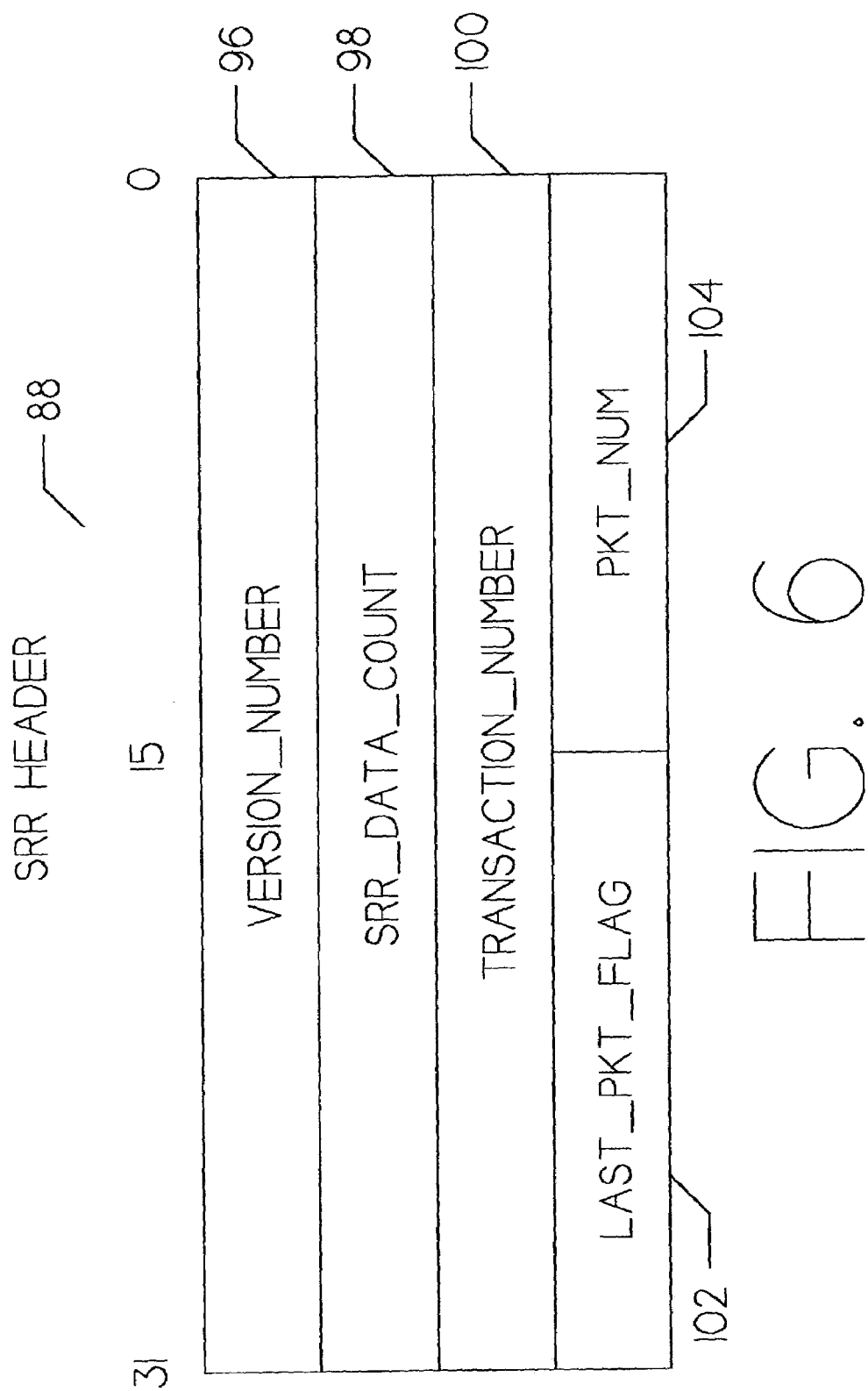
FIG. 6 is diagram showing the format of the SRR packet header.

FIG. 6 is a diagram showing the format of SRR header 88. The first 32 bit DWORD contains version number 96, which describes the version number of the service running on the platform. This is used to determine whether services running on primary/secondary platforms are compatible.

This is followed by SRR data count 98, indicating the number of 32 bit words within the SRR packet, and transaction number 100. The last 32 bit DWORD of the fixed length SRR header 88 contains Last Packet Flag 102, which indicates that the current packet is the last packet of an audit sequence and Packet Number 104. If Last Packet Flag 102 is set and Packet Number 104 is equal to 1, the current SRR packet is the only packet in the audit sequence.

Figure 7:
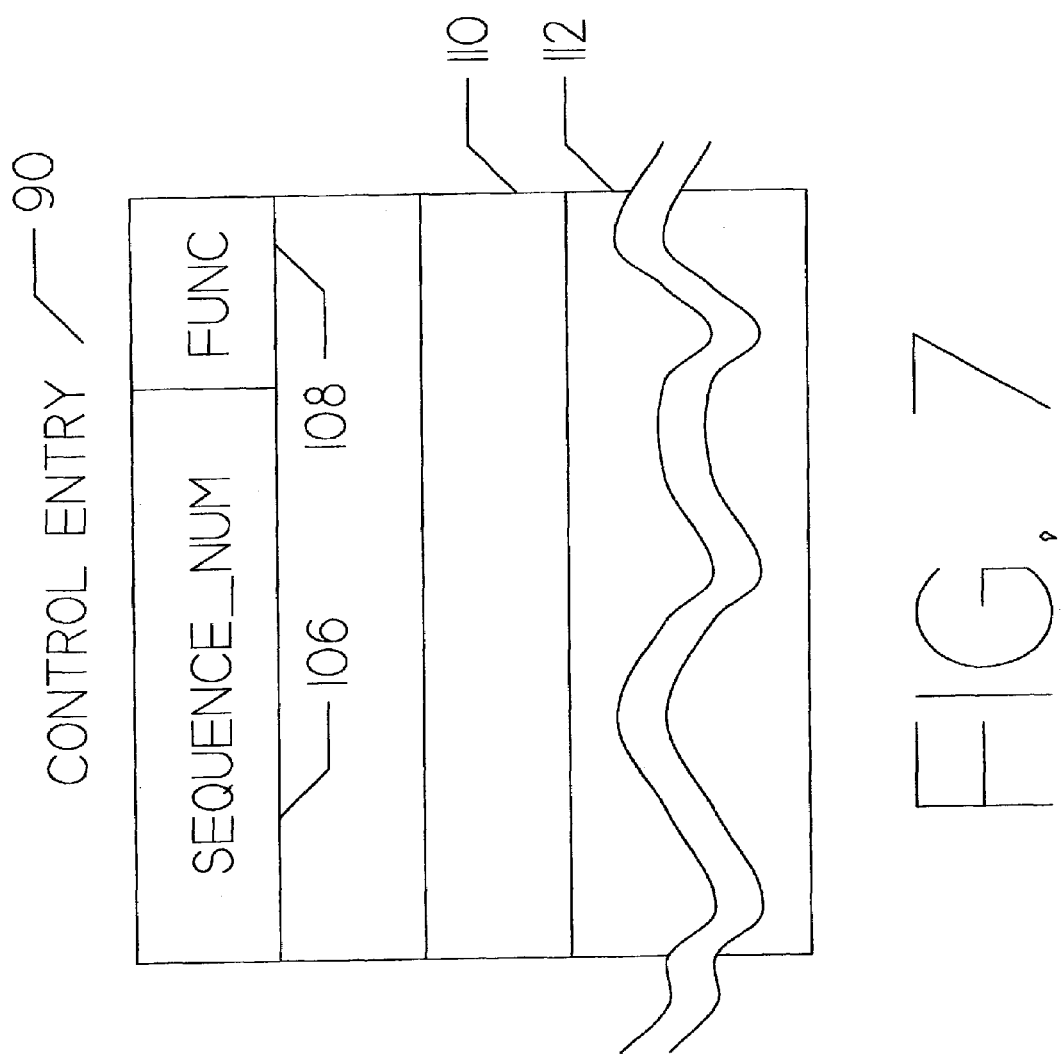
FIG. 7 is a diagram showing the format of a control entry.

FIG. 7 is a diagram showing the format of control entry go. Sequence Number 106 is available to keep track of the specific control entry. Function 108 determines the length of the control entry, because it determines the number of 32 bit words 110-112 required to define the function.

The function code is an 8 bit number which decodes into 256 different numbers. Values 0, 7-16, and 33-255 are defined as invalid. The remaining defined function codes are as follows:

1—Write Audit Data;
2—Audit Updates Completed;
3—Resend Audit Data;
4—Abort Audit Updates;
5—Audit Request Accepted;
6—Audit Request Rejected;
17—Heartbeat;
18—Probe Path Identification;
19—Path Identification;
20—Query Memory Size;
21—Return Memory Size;
22—Set Memory Size;
23—Transfer Coherent Memory;
24—Coherent Memory Transfer Completed;
25—Up/Down Path;
26—Switch State Pending;
27—Switch Master/Slave State;
28—Commit State Change;
29—Request permission to become active;
30—Terminate Service Request;
31—Positive Acknowledge; and
32—Negative Acknowledge.

Figure 8:
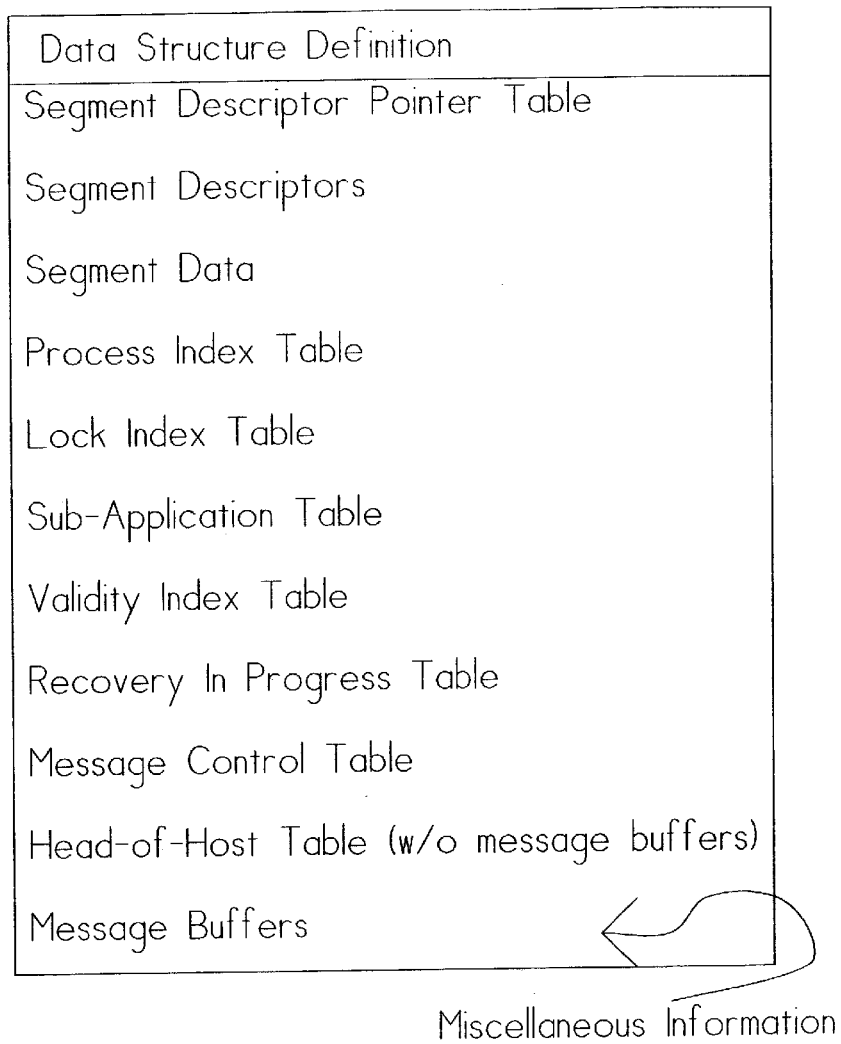
FIG. 8 is a memory allocation table for the cluster lock processing system.

FIG. 8 is a table showing structures that are allocated in memory as made by the XPC.

Figure 9:
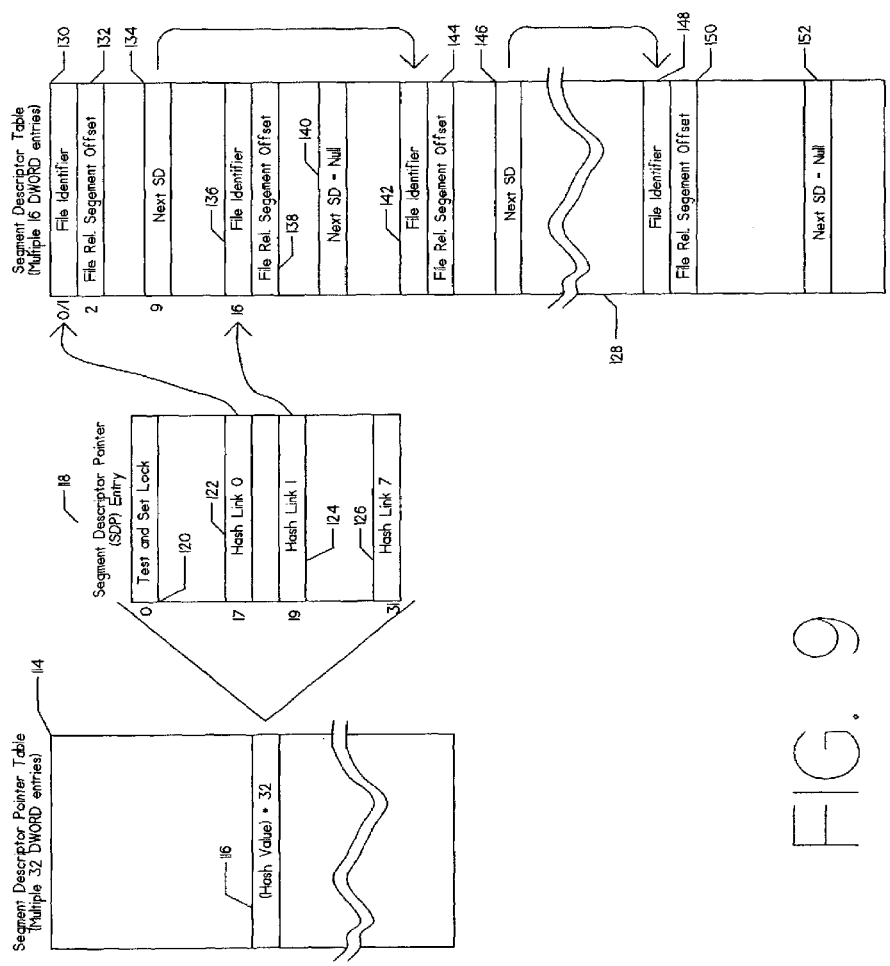
FIG. 9 is a detailed diagram showing operation of the segment descriptors.

FIG. 9 is a detailed diagram showing segment descriptor accessing. Segment Descriptor Pointer Table 114 consists of multiple 32 bit DWORD entries. Example 116 is an entry having hash value=32 which points to Segment Descriptor Pointer (SCP) Entry 118.

Segment Descriptor Pointer Entry 118 consists of 32 words of 32 bits each. The first word is the test and set lock which is used to control access to the segment descriptors that hash to this entry. The remaining words point to up to eight entries within the Segment Descriptor Table, consisting of multiple 16 bit DWORDs. Word 17 of Segment Descriptor Pointer Entry 116 is hash link 0 122, word 19 is hash link 1 124, and word 31 is hash link 7 126.

The file name associated with hash link 0 is File Identifier 130 occupying the first two words of the Segment Descriptor Table. The corresponding File Relative Segment Offset 132 is located in the next word. Word 9 is Next Segment Descriptor 134 which points to the next associated segment (i.e., File Identifier 142) as shown.

Similarly, the file name associated with hash link 1124 is File Identifier 136. File Relative Segment Offset 138 provides the corresponding relative offset. Because there are no further associated segment descriptors, Next Segment Descriptor 140 is null.

File Relative Segment Offset 144 corresponds to File Identifier 142. Associated therewith is Next Segment Descriptor 146 which points to File Identifier 148, located subsequent to extended area 128. File Relative Segment Offset 150 corresponds thereto. There are no further associated segment descriptors so Next Segment Descriptor 152 is null.

Figure 10:
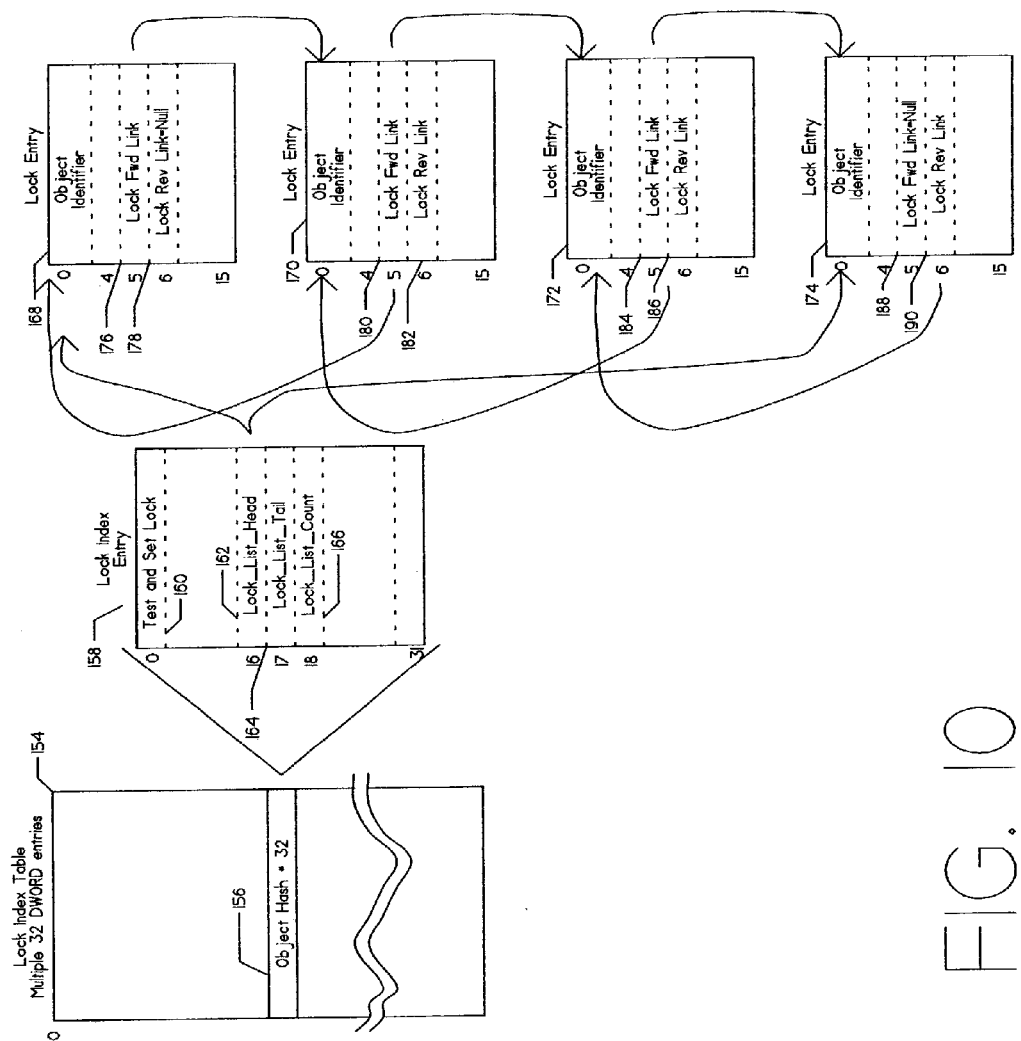
FIG. 10 is a detailed diagram showing operation of the locks.

FIG. 10 is a detailed diagram showing lock entry accessing. It is via this locking system that the XPC (see also FIG. 1) maintains control of the shared database facilities. Lock Index Table consists of multiple 32 DWORD entries. Example 156 is Object Hast *32 which points to Lock Index Entry 158.

Test and Set Lock 160 occupies the first word of Lock Index Entry 158. It is used to control access to this lock list. Lock_List_Head 162 provides the address of the first lock entry that hashes to this location. Lock_List_Tail 164 supplies the address of the last lock entry that hashes to his location. Lock_List_Count 166 specifies the number of lock entries on this lock list.

Object Identifier 168, Object Identifier 170, Object Identifier 172, and Object Identifier 174 name the actual lock entries for this particular lock list. Lock Forward Links 178, 180, 184, and 188 address the next lock entry in this lock list. Lock Reverse Links 178, 182, 186, and 190 supply the address of the previous lock entry in this lock list. Because it is associated with the first lock entry in the lock list, Lock Reverse Link 178 is Null.

Figure 11:
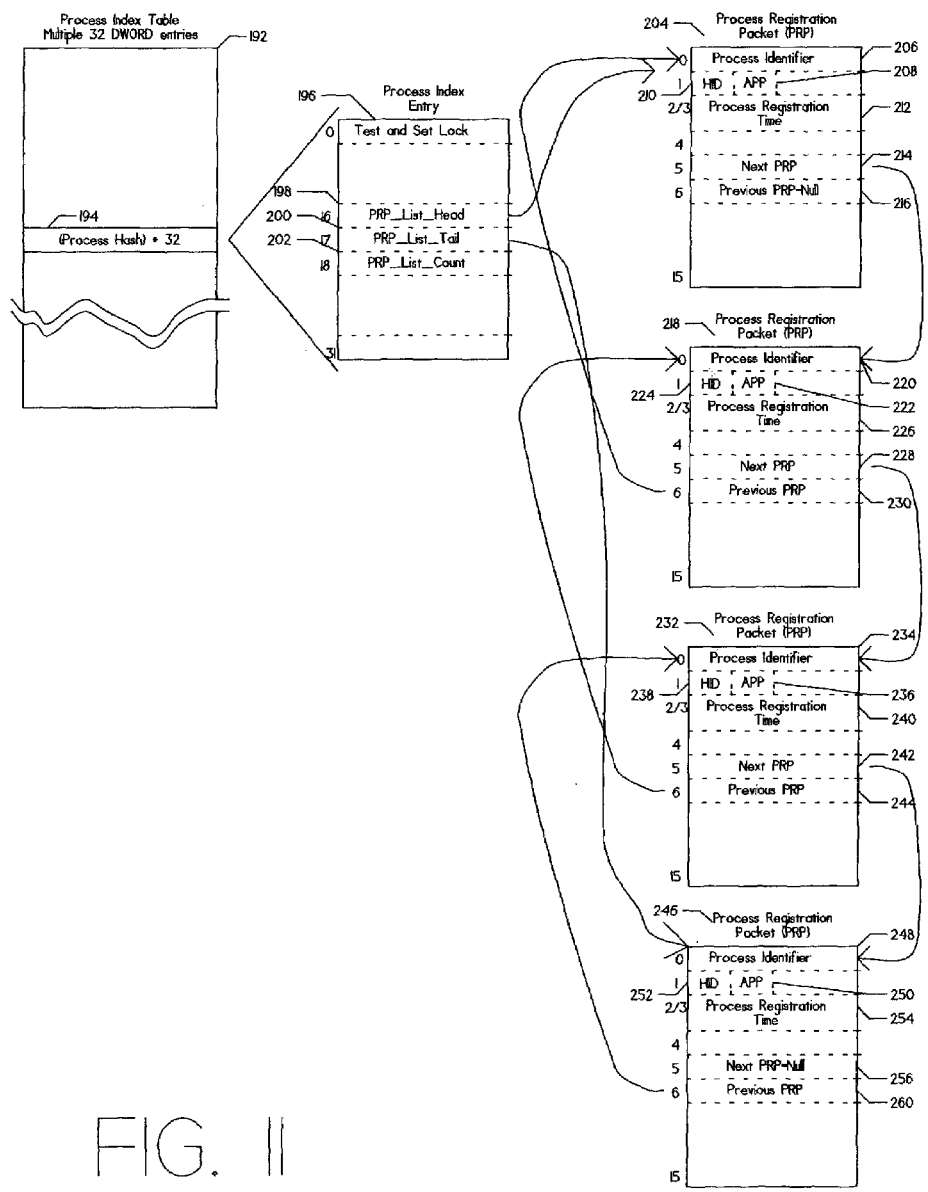
FIG. 11 is a detailed diagram showing operation of processes.

FIG. 11 is a detailed flow of Process Entry accessing in accordance with the preferred mode of the present invention. Process Index Table 192 consists of multiple 32 bit DWORD entries. Sample entry 194 contains process hash *32 which identifies the Process Index Entry shown.

Test and Set Lock 196 is used to control access to this process list. PRP_List_Head 198 addresses the first Process Registration Packet 204 that hashes to this location. PRP_List_Tail 200 supplies the address of the last Process Registration Packet 246 that hashes to this location. PRP_List_Count 202 provides the number of Process Registration Packets on this process list.

Process Registration Packets (PRP) 204, 218, 232, and 246, each consist of 16-32 bit DWORDs. The first word is Process Identifier 206, 220, 234, and 248, respectively. The second word contains Host Identifier 210, 224, 238, and 252 and Application Identifier 208, 222, 236, and 250, each of which define processing for the corresponding clustered instruction processor.

Process Registration time 212, 228, 240, and 254 is maintained in each of the Process Registration Packets. Part of the time is derived from the Windows operating system time and part from a code-maintained counter, which is sized to assure overall registration time uniqueness.

Next PRP 214, 228, 242, and 256 point to the next Process Registration Packet within the list. Because PRP Packet 246 is the last packet in the list, nest PRP is set to null. Similarly, Previous PRP 216, 230, 244, and 260 each point to the next previous PRP packet. Because PRP Packet 204 is the first packet in the list, Previous PRP is set to null.

Figure 12:
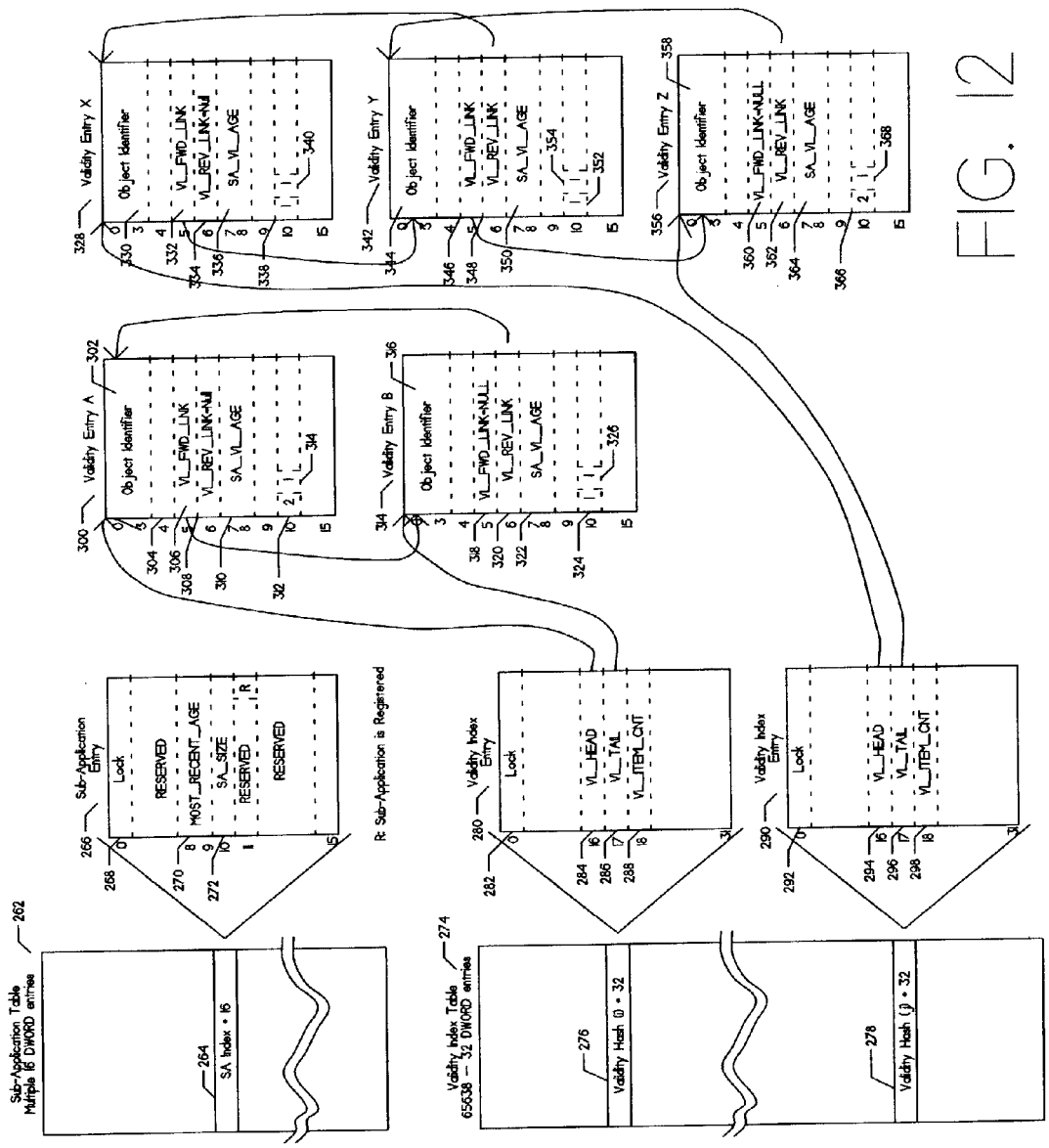
FIG. 12 is a detailed diagram showing operation of sub-applications and validity entries.

FIG. 12 is a detailed view of the Inter-Host Cache (IHC) data structures. Two validity lists are shown in the example, with validity entries for sub-applications 1:1 and 2:1. The sub-application entry is shown for sub-application 1:1, and contains the Most_Recent_Age of validity entries for sub-application 1:1. The Most_Recent_Age is used in conjunction with the sub-application size (SA_SIZE) to implement a MRU/LRU algorithm used to determine if the validity object is within the sub-application cache. Validity list entries which are outside of the LRU limit are removed whenever a validity operation encounters an 'old' entry. This is accomplished via a scan of the entire validity list after status is returned to the host.

In the example, validity list 'i' contains two entries (A and B), one each for sub-application 1:1 and 2:1. Validity list 'j' contains three entries (X, Y and Z), two for sub-application 1:1 and one for sub-application 2:1. The sub-application entry is shown for sub-application 1:1, having a Most_Recent_Age of 683 and SA_Size of 100, yielding a "validity age" range of 584-683. The validity entries in validity list 'j' (entries X and Y) are both within the range and are therefore within the sub-application cache. However, the validity entry B in validity list 'i' for sub-application 1:1 is not within the range, and is therefore not with in the sub-application cache. The next IHC operation that references validity list 'i' will find and remove the 'aged out' entry.

Sub-Application Table 252 contains multiple 16 DWORD entries. Entry 254 contains a Sub-Application Index *16 which points to Sub-Application Entry 266. The first word is Test and Set Lock 268 which controls access to the sub-application entry. MOST_RECENT_AGE 270 is the counter value for the most recently accessed validity entry in this sub-application. After its initial value of zero, the only operations allowed on this field are increments. SA_SIZE 272 is the number of validity entries for this sub-application. This is the value as seen by the hosts and not the actual number of validity entries that are on the validity lists.

Validity Index Table 274 contains multiple 32 DWORD entries. A first sample entry 276 contains Validity Hash (i*32) which points to Validity Index Entry 280. A second sample entry 278 contains Validity Hash (j*32) which points to Validity Index Entry 290.

Validity Index Entry 280 has a Test and Set Lock 282 which is used to control access to this validity list. VL_HEAD 284 supplies the address of the first validity entry (i.e., Validity Entry A 300) that hashes to his location. Similarly, VL_TAIL 286 contains the address of the last validity entry (i.e., Validity Entry B 314) that hashes to this location. VL_ITEM_CNT 288 specifies the number of validity entries on this validity list.

Validity Index Entry 290 has a Test and Set Lock 292 which is used to control access to this validity list. VL_HEAD 294 supplies the address of the first validity entry (i.e., Validity Entry X 328) that hashes to his location. Similarly, VL_TAIL 296 contains the address of the last validity entry (i.e., Validity Entry Z 356) that hashes to this location. VL_ITEM_CNT 298 specifies the number of validity entries on this validity list.

Each of Validity Entries A 300, B 314, X 328, Y 342, and Z 356 contains an Object Identifier (i.e., 302, 316, 330, 344, and 358); a forward link (i.e., VL_FWD_LINK 306, 318, 332, 346, and 360); a reverse link (i.e., VL_REV_LINK 308, 320, 334, 348, and 362); and an age (i.e., SA_VL_AGE 310, 322, 336, 350, and 364).

Figure 13:
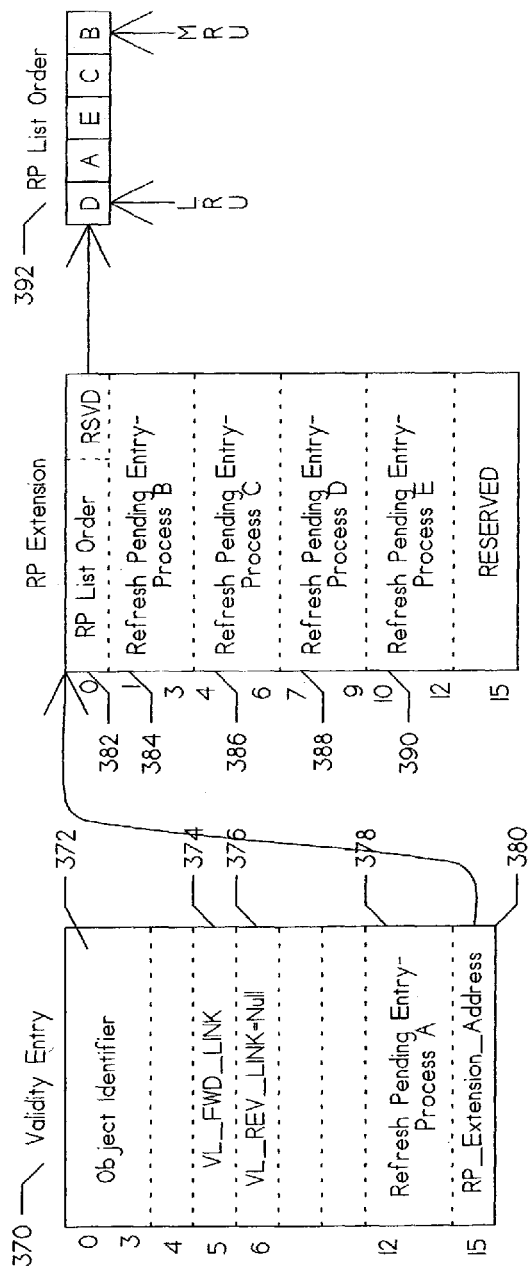
FIG. 13 is a detailed diagram showing operation of the refresh pending entries.

FIG. 13 is detailed diagram showing the format of Validity Entry 370 with Refresh Pending Extension. Validity Entry 370 contains VL_FWD_LINK 374 and VL_REV_LINK 375, as previously discussed. In this example, the validity entry (i.e., Validity Entry 370) is shown with five processes within the same sub-application in 'refresh pending' state. Refresh Pending Entry-Process A 378 shows that Process A was the first referenced for this validity entry. The order of the processes in the RP Extension entries (i.e., entries 384, 386, 388, and 390) indicates that the processes initially referenced the validity entry in the order of A-B-C-D-E. However, subsequent references to the same validity entry occurred in a different order. The 'RP List Order' 382 maintains an LRU/MRU list of the current processes in the Refresh Pending entries. In the example shown at detail 392, process B referenced the validity entry most recently, whereas process D referenced the validity entry least recently (i.e., or oldest reference). The RP Extension is addressed by RP_Extension_Address 380.

Figure 14:
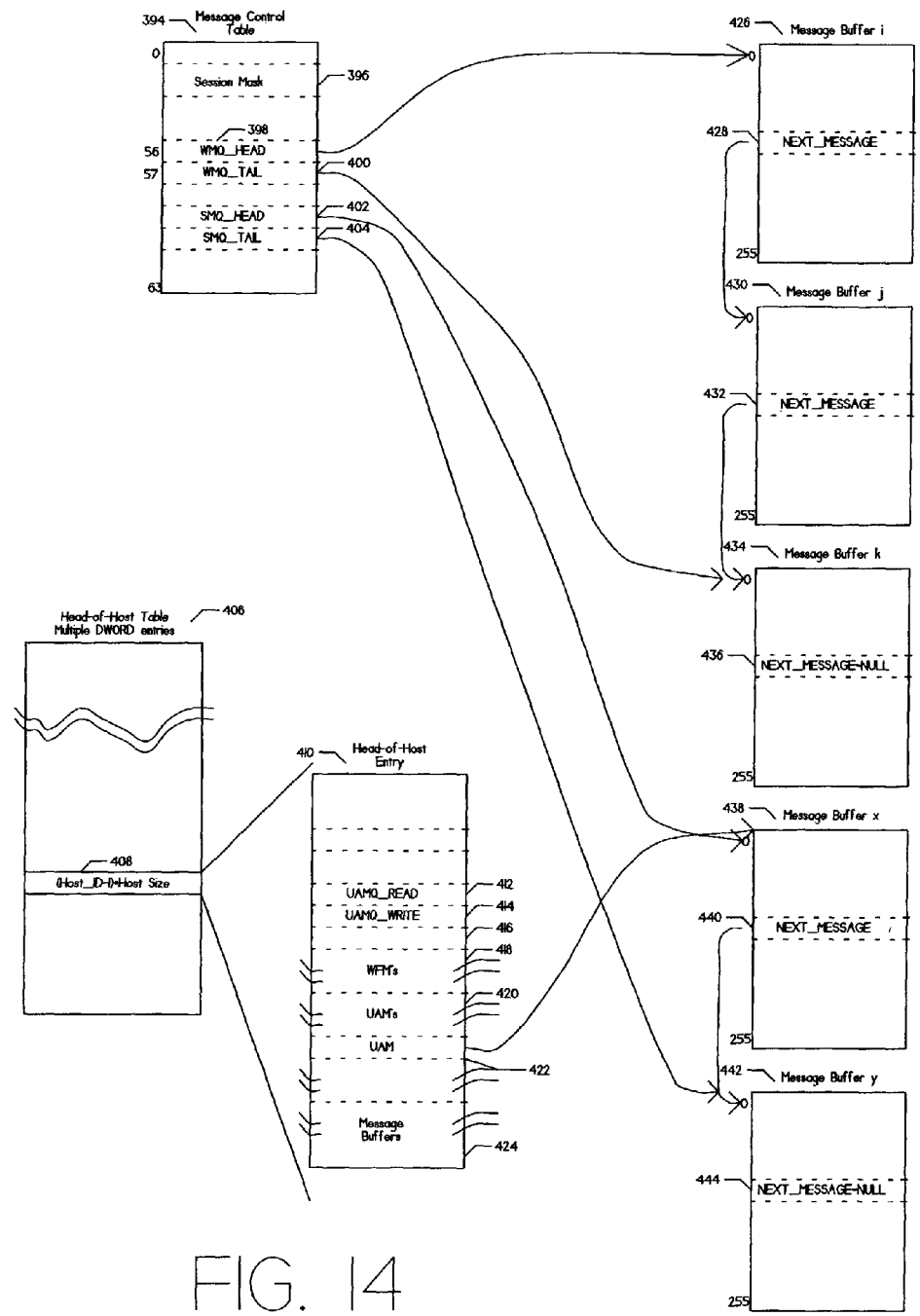
FIG. 14 is a detailed diagram showing operation of messages.

FIG. 14 is a detailed diagram showing the messaging implementation. In the example shown, messages (represented by message buffers i 426, j 430, and k 434) reside on the 'waiting message queue' (WMQ), waiting for a wait-for-message (WFM) from each addressed host. Message Control Table 394 points to Message Buffer i 426 via WMQ_HEAD 398 and to Message Buffer k 434 via WMQ_TAIL 400. The three message buffers are internally linked via NEXT_MESSAGE 428, 432, and 436. Messages (represented by Message Buffers x 438 and y 442) have been sent to the host(s) but have not yet been acknowledged, and both are members of the 'sent message queue' (SMQ). SMQ_HEAD 402 points to Message Buffer x 438 and SMQ_TAIL 404 points to Message Buffer y 442. Message Buffer 'x' 438 belongs to the host corresponding to the shown head-of-host (HOH) entry, and Message Buffer 'y' 442 belongs to some other host. NEXT_MESSAGE 440 and 444 link messages in the sent message queue.

The message buffers are shown as separate entries for purposes of clarity and are derived from the Message Buffers in the Head-of-Host entries. The collection of Message Buffers in a HOH entry 410 are known as a Host Message Buffer Queue (HMBQ). In the example shown, Message Buffer 'x' 438 resides within the Message Buffers 422 of the shown HOH entry 410. A Head-of-Host Table (HOHT) 406 contains an entry for each of the 64 possible hosts, each table entry contains an array of active Wait-For-Message commands (WFMs), an array of Unacknowledged Messages (UAMs), and an array of message buffers. The Message Control Table (MCT) contains the addresses of the global data structures and test-and-set lock structures required by IHM (inter-host messaging).

Figure 15:
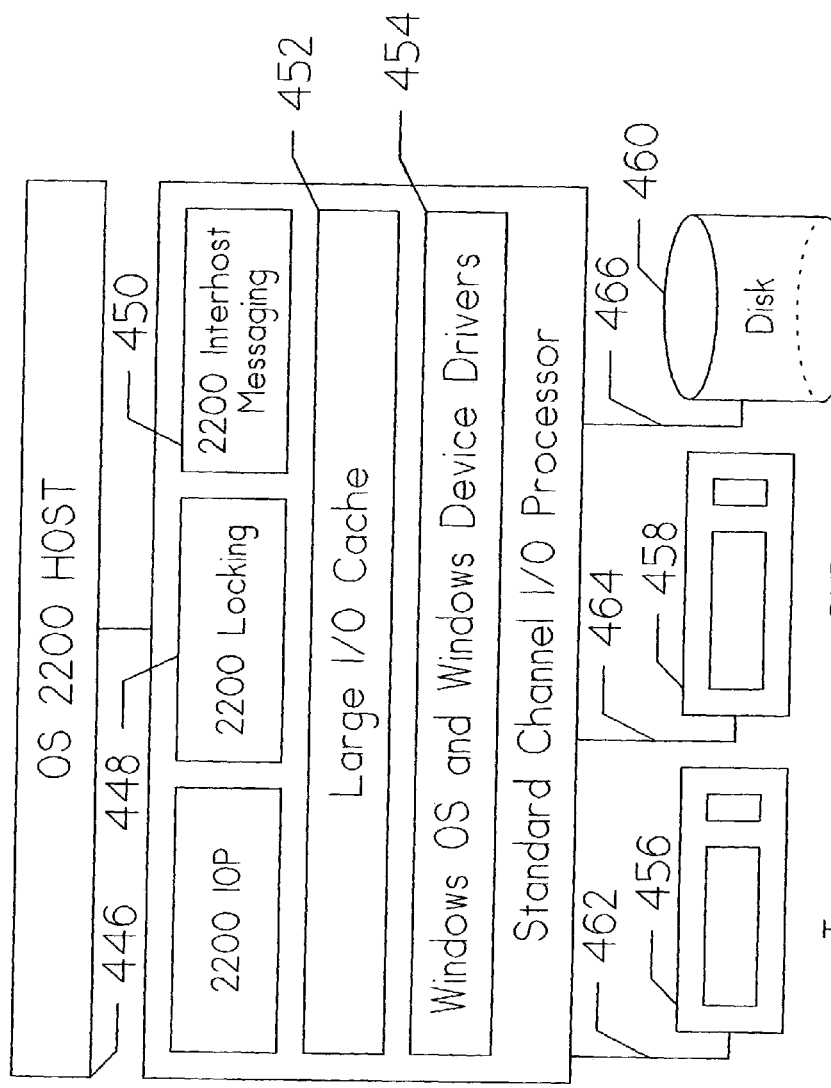
FIG. 15 is a detailed diagram showing integration of the various functions into a single platform.

FIG. 15 is a detailed diagram showing integration of the cluster/locking, caching, and mass storage accessing functions into a single platform. In the actual hardware, the OS 2200 host 446 communicates directly with the single platform incorporating the 2200 IOP 446, 2200 Locking 448, and 2200 Interhost Messaging 450 functionality as shown.

Also included within the same single platform is Large I/O Cache 452, Windows Operating system and Device Drivers 454, and the Standard Channel I/O Processor as shown. The present invention incorporates each of these elements into a single platform. Therefore, communication with Tape 456, DVD 458, and Disk 460, via paths 462, 464, and 466, respectively, is accomplished within the same hardware entity as is interfaced directly with OS 2200 Host 446.

FIG. 16 shows the format of an Audit Buffer Control Entry (ABCE). Certain operations require a larger amount of audit data than can be contained within a single SRR Pkt (see also FIG. 5). The slave is required to queue all of the SRR Pkts that contain the audit data and receive an audit commit indication prior to initiating the data structure update procedure. This is accomplished by the use of the Audit Buffer Control Entry (ABCE) for that VI, which contains sufficient space to maintain a list of addresses of the SRR Pkts containing the audit data. Similarly, the master is required to maintain a list of all SRR Pkts that have been sent to the slave. The master maintained list is used to allow resending of a list of SRR Pkts, which is required for recovering from sync path failures. Both master and slave contain sufficient Audit Buffer Control entries to allow simultaneous execution of the maximum number of multiple-SRR Pkt generating commands via the host paths. The first entry in an idle Audit Buffer Control Entry corresponding to a new audit sequence is time-stamped to allow detection of stalled (or improper) master operation.

In accordance with the Audit Buffer Control Entry shown in FIG. 16, 32-bit word 0 is STATE. This is the current state of the Audit Buffer Control Entry, indicating whether it is idle, active, update in progress, or timed out. Similarly, TRANSACTION NUMBER of 32-bit word 1 is a unique identifier defining an audit sequence that requires more than one SRR Pkt to contain the audit data. The TRANSACTION_INITIATION_TIME is the system time of the receipt of the first SRR Pkt containing the audit data. LAST_PKT_RECEIVED is the packet number of the SRR Pkt that was received with LAST_PKT_FLAG set. SRR_ADDRESS-SRR_PKT_NUM_x is the virtual address of an SRR Pkt whose packet number is "x". The Audit Buffer Control Entry Pool is an array of 38 available Audit Buffer Control Entries. Access to this array uses the sync path VI number to compute the appropriate index value.

Figure 17:
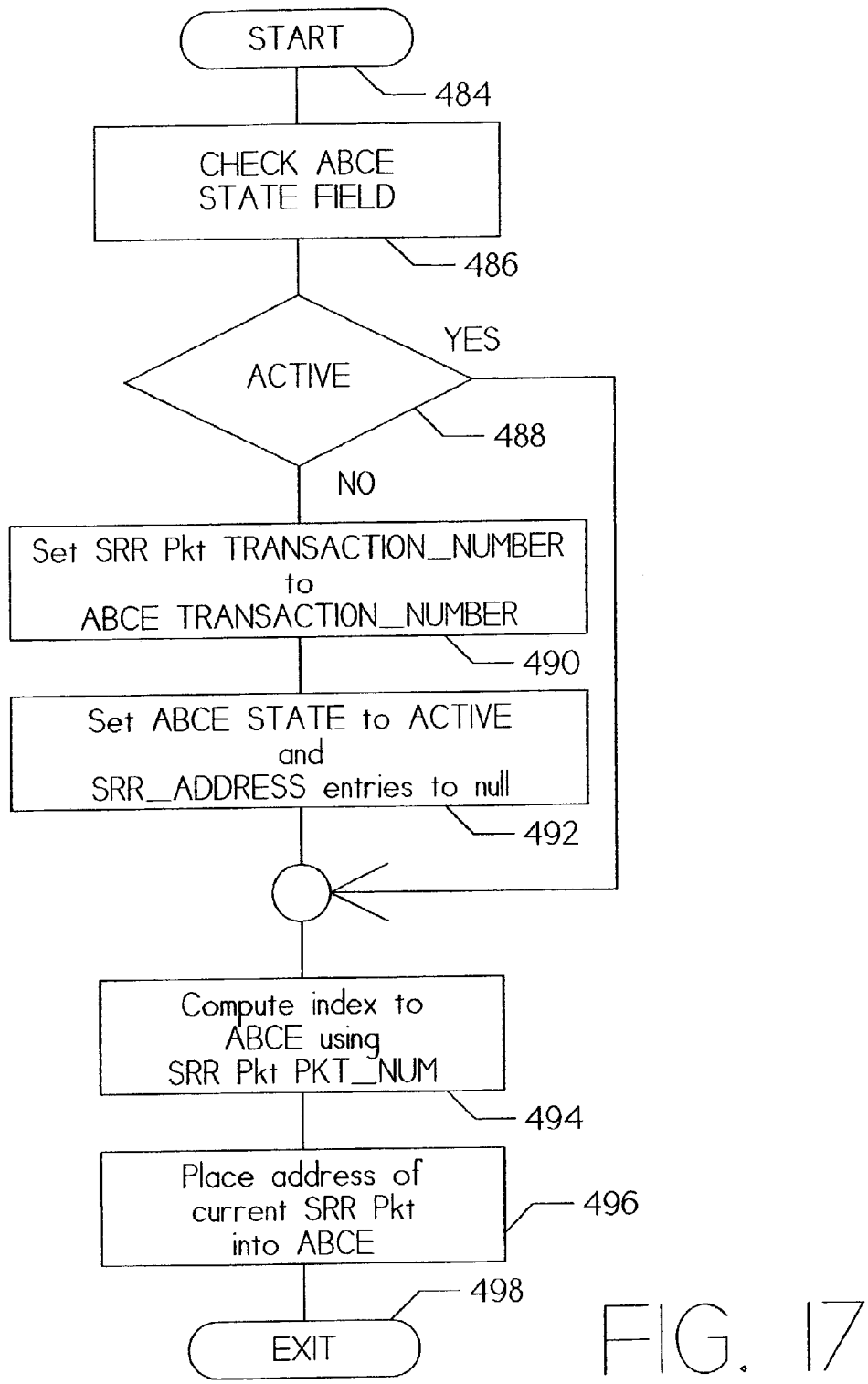
FIG. 17 is a detailed flow diagram showing handling of the Audit Buffer Control Entry by the master.

FIG. 17 is a detailed flow diagram showing how the master handles the Audit Buffer Control Entry (ABCE). The process begins at element 484. The state field (see also FIG. 16) is checked at element 486. Element 488 determines if the state field indicates that the ABCE is active. If yes control is given to element 494 for further processing.

If element 488 finds that the state field does not indicate active, element 490 sets the SRR Pkt TRANSACTION_NUMBER to ABCE TRANSACTION_NUMBER. Element 492 then sets the state to active and sets all of the SRR_ADDRESS entries to null.

Computation of the ABCE index is accomplished using SRR Pkt PKR_NUM at element 494. Element 496 places the address of the current SRR Pkt into the ABCE. Exit occurs via element 498.

Figure 18:
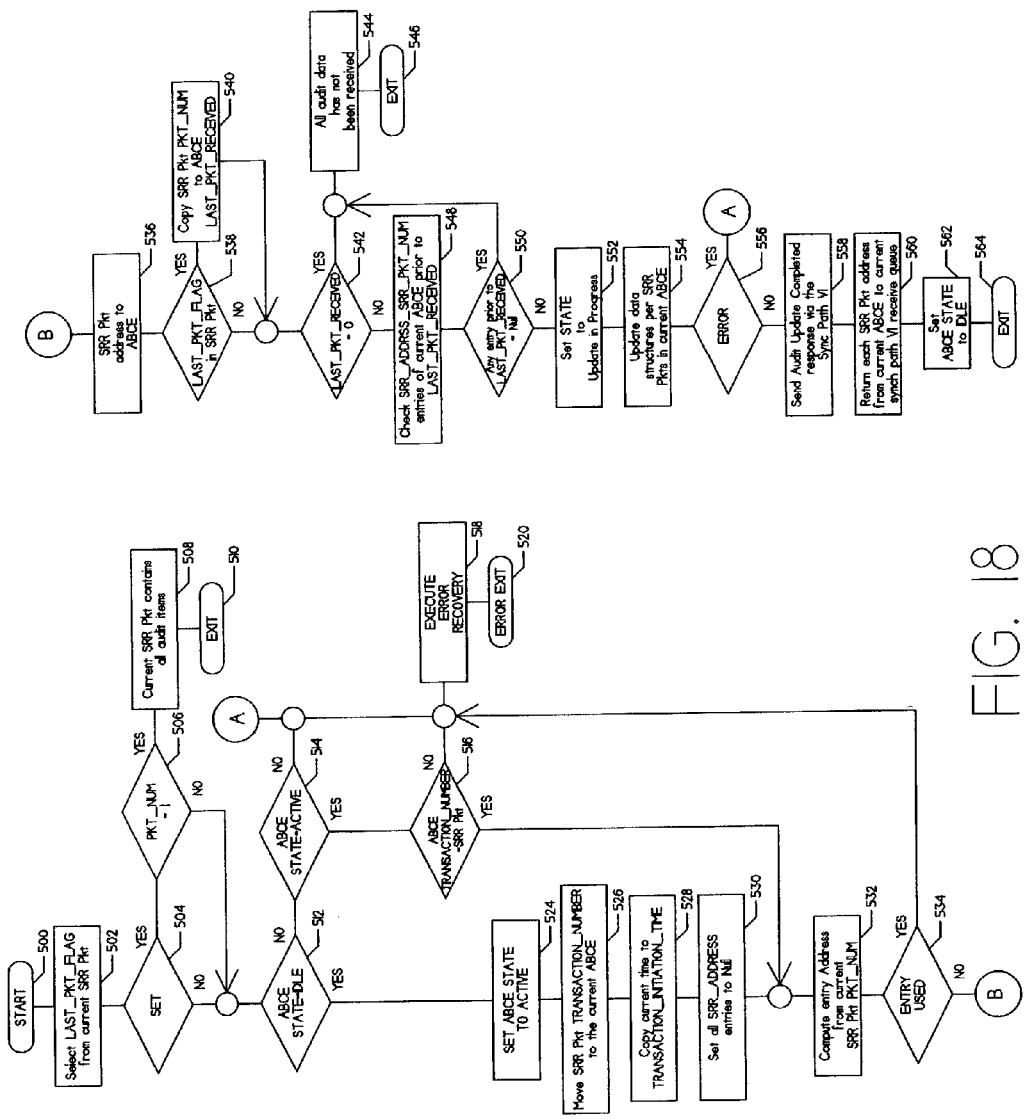
FIG. 18 is a detailed flow diagram showing handling of the Audit Buffer Control Entry by the slave.

FIG. 18 is a detailed flow diagram of the process for handling the ABCE by the slave. Entry is at element 500. Element 502 selects the LAST_PKT_FLAG from the current SRR Pkt. If the flag is set, element 504 routes control to element 506 for a determination of the content of PKT_NUM. If it is not set, control is returned to element 512. If the packet number is 1, element 508 shows that the current SRR packet contains all of the audit items and exit is via element 510.

Element 512 determines whether the ABCE state is idle. If yes, control is given to element 524. If no, element 514 determines whether the ABCE state is active. If no, control is given to element 518, that performs error recovery with exit via element 520. If yes, element 516 determines whether the ABCE transaction number is the same as the SRR packet. If yes, control is routed to element 532. If no, element 518 performs error recovery with exit via element 520.

Element 524 sets the ABCE state to active. The SRR packet number is moved to the current ABCE by element 526. TRANSACTION_INITATION_TIME is loaded with the current time by element 528. Element 530 sets all SRR ADDRESS entries to null. The entry address is computed at element 532 from SRR packet number. Element 534 determines if the entry was used. If yes, control is given to element 518 for error recovery. Otherwise control is routed to element 536 for continuation of the process.

The SRR address is set to the ABCE address at element 536. Element 538 determines if the last packet flag is set in the SRR packet. If yes, control is given to element 520 to set LAST_PKT_RECEIVED to the SRR packet number. Element 542 determines if LAST_PKT_RECOVERY is null. If yes, control is given to element 544 indicating that all audit data has not been received. Exit is via element 546.

If no, control is routed to element 548 which checks the SRR packet addresses of packet numbers prior to the last packet received. If any SRR_ADDRESS_SRR_PKT_NUM_X prior to LAST_PKT_RECEIVED is null, control is given to element 544 by element 550, because not all audit data has been received. If not, element 552 sets STATE to update in progress. Element 554 updates the data structures defined by the SRR packets of the current ABCE. Element 556 determines if an error has been generated by the update process. If yes, control is given to element 518 for error recovery. If not, element 558 sends an audit update completed response via the Sync Path VI. Element 560 returns each SRR packet address from the current ABCE to the current sync path VI receive queue. Element 562 sets the ABCE state to idle. Exit is via element 564.

Having thus described the preferred embodiments of the present invention, those of skill in the art will be readily able to adapt the teachings found herein to yet other embodiments within the scope of the claims hereto attached.

We claim:

1. In a data processing system, the improvement comprising:
   a. a shared memory;
   b. a plurality of commodity clustered instruction processors each operating under an operation system wherein each of said plurality of said commodity clustered instruction processors is directly coupled to said shared memory and wherein each of said plurality of commodity clustered instruction processors is designed for and marketed to general public;
   c. a master cluster lock manager responsively coupled to each of said plurality of commodity clustered instruction processors which is coupled to said shared memory only via said plurality of commodity clustered instruction processors and which manages execution of each of said plurality of commodity clustered instruction processors;
   d. a plurality of host computers responsively coupled to said master cluster lock manager and;
   e. a slave cluster lock manager responsively coupled to said master cluster lock manager and to each of said plurality of commodity clustered instruction processors.

2. The improvement according to claim 1 wherein operating system further comprises a windows operating system.

3. The improvement according to claim 2 further comprising a first host computer responsively coupled to said master cluster lock manager and said slave cluster lock manager.

4. The improvement according to claim 3 further comprising a second host computer responsively coupled to said master cluster lock manager and said slave cluster lock manager.

5. An apparatus comprising:
   a. a shared memory;
   b. a plurality of commodity clustered instruction processors each operating under an operation system and each coupled to said shared memory and wherein each of said plurality of commodity clustered instruction processors is designed for and marketed to general public;

c. a master cluster lock manager responsively coupled to each of said plurality of commodity clustered instruction processors which is coupled to said shared memory only via one of said plurality of commodity clustered instruction processors and which manages execution by each of said plurality of commodity clustered instruction processors and;

d. a slave cluster lock manager responsively coupled to each of said plurality of commodity clustered instruction processors and to said master cluster lock manager.

6. The apparatus of claim 5 wherein said operating system further comprises a Windows operating system.

7. The apparatus of claim 6 further comprising a first host computer responsively coupled to said master cluster lock manager.

8. The apparatus of claim 7 further comprising a second host computer responsively coupled to said master cluster lock manager.

* * * * *